United States Patent [19]
Hauck et al.

[11] Patent Number: 6,091,426
[45] Date of Patent: Jul. 18, 2000

[54] INTEGRATING DATA SCALING AND BUFFERING FUNCTIONS TO MINIMIZE MEMORY REQUIREMENT

[75] Inventors: Jerrold V. Hauck, Fremont, Calif.; Randy R. Dunton, Phoenix, Ariz.; Robert L. Farrell, Hillsborough, N.J.

[73] Assignee: Intel Corporation, Santa Clara, Calif.

[21] Appl. No.: 08/887,415

[22] Filed: Jul. 3, 1997

Related U.S. Application Data

[63] Continuation of application No. 08/419,005, Apr. 7, 1995, abandoned.

[51] Int. Cl.[7] ........................................... G09G 5/00
[52] U.S. Cl. ........................... 345/439; 345/131; 348/581
[58] Field of Search ................... 345/439, 127, 345/132, 128, 129, 130, 131; 348/441, 581, 580

[56] References Cited

U.S. PATENT DOCUMENTS

| | | | |
|---|---|---|---|
| 4,819,201 | 4/1989 | Thomas et al. | 395/250 |
| 4,959,815 | 9/1990 | Wada | 365/230.06 |
| 5,067,019 | 11/1991 | Juday et al. | 348/580 |
| 5,220,529 | 6/1993 | Kohiyama et al. | 365/189.01 |
| 5,335,295 | 8/1994 | Ferracini et al. | 382/298 |
| 5,469,223 | 11/1995 | Kimura | 348/581 |
| 5,519,449 | 5/1996 | Yanai et al. | 348/598 |
| 5,528,301 | 6/1996 | Hau et al. | 348/441 |
| 5,619,226 | 4/1997 | Cahill, III | 345/132 |
| 5,694,149 | 12/1997 | Cahill, III | 345/127 |
| 5,754,162 | 5/1998 | Cahill, III | 345/127 |
| 5,784,047 | 7/1998 | Cahill, III et al. | 345/127 |

OTHER PUBLICATIONS

Hart, Charles A., CDRAM in a Unified Memory Architecture, 1994, pp. 261–266, IEEE.

–Paul Scheidt, "Digital Filter Design Using VHDL," Electronic Product Design, pp. 31–34 (Feb. 1993).

–Chi–Jui Chou, "FPGAs Can be Used to Implement Digital Filters," Electronic Engineering Times, pp. 64, 90 and 94 (Sep. 27, 1993).

–Kien Du Phung, "Implementation of a High–Speed FIR Filter Using a BiCMOS–ECL Mixed Gate Array with Embedded SRAM," IEEE, pp. P3–6.1 through P3–6.4 (1991).

–i750, i860 & i960 Processors and Related Products, Intel Corporation, pp. 1–79 through 1–80 (1993).

*Primary Examiner*—Steven J. Saras
*Assistant Examiner*—Alecia D. Nelson
*Attorney, Agent, or Firm*—Blakely, Sokoloff, Taylor & Zafman LLP

[57] ABSTRACT

A scaling circuit residing on a single silicon substrate includes a buffer for storing a plurality of partially scaled data. A multiplier is provided for multiplying a weight signal with each of a plurality of input data to produce a plurality of weighted data. An adder is coupled to (1) the multiplier and (2) the buffer for adding each of the weighted data to one of the partially scaled data to produce a plurality of scaled data. When a first one of the scaled data is produced by the adder, the first one of the scaled data can remain in the buffer until displaced by a new data to be scaled such that the scaling circuit is directly coupled to an external bus without requiring any external buffering memory coupled in between. A method for scaling a block of data and transferring the scaled data to the bus is also described.

9 Claims, 9 Drawing Sheets

LINE BUFFER A

| | LOC0 | LOC1 | ... | LOCn |
|---|---|---|---|---|
| $T_1$ | $x_0^0 w_0^A$ | | ... | |
| $T_2$ | $x_0^0 w_0^A$ | $x_0^1 w_0^A$ | ... | $x_0^n w_0^A$ |
| $T_3$ | $x_0^0 w_0^A + x_1^0 w_1^A$ | $x_0^1 w_0^A + x_1^1 w_1^A$ | ... | $x_0^n w_0^A + x_1^n w_1^A$ |
| $T_4$ | $x_0^0 w_0^A + x_1^0 w_1^A + x_2^0 w_2^A$ | $x_0^1 w_0^A + x_1^1 w_1^A + x_2^1 w_2^A$ | ... | $x_0^n w_0^A + x_1^n w_1^A + x_2^n w_2^A$ |
| $T_5$ | $x_0^0 w_0^A + x_1^0 w_1^A + x_2^0 w_2^A + x_3^0 w_3^A$ | $x_0^1 w_0^A + x_1^1 w_1^A + x_2^1 w_2^A$ | ... | $x_0^n w_0^A + x_1^n w_1^A + x_2^n w_2^n$ |
| $T_6$ | $x_0^0 w_0^A + x_1^0 w_1^A + x_2^0 w_2^A + x_3^0 w_3^A$ | $x_0^1 w_0^A + x_1^1 w_1^A + x_2^1 w_2^A + x_3^1 w_3^A$ | ... | $x_0^n w_0^A + x_1^n w_1^A + x_2^n w_2^A + x_3^n w_3^A$ |
| $T_7$ | $x_4^0 w_0^A$ | $x_0^1 w_0^A + x_1^1 w_1^A + x_2^1 w_2^A + x_3^1 w_3^A$ | ... | $x_0^n w_0^n + x_1^n w_1^A + x_2^n w_2^A + x_3^n w_3^A$ |
| $T_8$ | $x_4^0 w_0^A$ | $x_4^1 w_0^A$ | ... | $x_4^n w_0^A$ |

TIME

*Figure 8A*

LINE BUFFER B

| | LOC0 | LOC1 | ... | LOCn |
|---|---|---|---|---|
| $T_{3a}$ | $x_2^0 w_0^B$ | | ... | |
| $T_4$ | $x_2^0 w_0^B$ | $x_2^1 w_0^B$ | ... | $x_2^n w_0^B$ |
| $T_6$ | $x_2^0 w_0^B + x_3^0 w_1^B$ | $x_2^1 w_0^B + x_3^1 w_1^B$ | ... | $x_2^n w_0^B + x_3^n w_1^B$ |
| $T_8$ | $x_2^0 w_0^B + x_3^0 w_1^B + x_4^0 w_2^B$ | $x_2^1 w_0^B + x_3^1 w_1^B + x_4^1 w_2^B$ | ... | $x_2^n w_0^B + x_3^n w_1^B + x_4^n w_2^B$ |
| $T_9$ | $x_2^0 w_0^B + x_3^0 w_1^B + x_4^0 w_2^B + x_5^0 w_3^B$ | $x_2^1 w_0^B + x_3^1 w_1^B + x_4^1 w_2^B$ | ... | $x_2^n w_0^B + x_3^n w_1^B + x_4^n w_2^B$ |
| $T_{10}$ | $x_2^0 w_0^B + x_3^0 w_1^B + x_4^0 w_2^B + x_5^0 w_3^B$ | $x_2^1 w_0^B + x_3^1 w_1^B + x_4^1 w_2^B + x_5^1 w_3^B$ | ... | $x_2^n w_0^B + x_3^n w_1^B + x_4^n w_2^B + x_5^n w_3^B$ |
| $T_{11}$ | $x_6^0 w_0^B$ | $x_2^1 w_0^B + x_3^1 w_1^B + x_4^1 w_2^B + x_5^1 w_3^B$ | ... | $x_2^n w_0^B + x_3^n w_1^B + x_4^n w_2^B + x_5^n w_3^B$ |
| $T_{12}$ | $x_6^0 w_0^B$ | $x_6^1 w_0^B$ | ... | $x_6^n w_0^B$ |

TIME

*Figure 8B*

INTEGRATING DATA SCALING AND BUFFERING FUNCTIONS TO MINIMIZE MEMORY REQUIREMENT

This is a continuation application of U.S. patent application Ser. No. 08/419,005, filed Apr. 7, 1995, now abandoned.

FIELD OF THE INVENTION

The present invention pertains to the field of data processing and communication systems. More particularly, this invention relates to a circuit for integrating data scaling and buffering functions together such that redundant memory is not required to implement the two functions.

BACKGROUND OF THE INVENTION

FIG. 1 illustrates a prior art computer system 10 that includes a prior video processing system 12 connected to a bus 14 of computer system 10 via a buffer 13. Video processing system 12 receives analog video data from an external video camera (not shown) and then converts and decodes the video data in a converter 12a and a decoder 12b. The processed digital video data are then applied to a scaling circuit 12c for scaling down the video image. The scaled data are then applied to a display 18 via bus 14 for display or to a memory (e.g., memory 17) via bus 14 for storage before being displayed on display 18.

In a prior video processing and communication system such as system 12 as shown in FIG. 1, spatial down-scaling of a digital video image is typically accomplished by passing the image data through a low pass filter and subsampling the resulting data. Storage elements are typically required for the filtering as multiple input samples, or taps, are combined to generate one output sample during the filtering operation. The total amount of storage or memory required depends on the number of desired filter taps and the ordering of the input data. As an example, the amount of memory required for vertical scaling of a video image can be substantial because pixels usually arrive in raster order. This typically causes an entire line of horizontal pixels to be buffered between each pair of vertically adjacent pixels.

When the scaled video image data are then delivered to display 18 or memory 17 via bus 14, a memory configured as a FIFO (First-in-First-Out) buffer 13 is typically required. FIFO buffer 13 is used to buffer the data before they are sent to bus 14. This is because bus 14 may be engaged in data transfer between other devices connected also to bus 14 when the scaled video image data are available for transmission by bus 14. When this occurs, the scaled video image data need to be buffered until bus 14 becomes available to transmit the data. The time period from the time the scaled data are available for transmission but bus 14 is not available to the time bus 14 is available for transmission of the scaled data is typically referred to as the latency period. As is known, the amount of buffering required for the scaled data is typically determined by the duration of the latency period and the incoming data rate. Systems with high latency periods or high data transfer rates typically require large latency FIFO buffers.

Therefore, in a system that requires a data stream to be both down-scaled and delivered to a shared resource (e.g., bus), memory is typically required to buffer or store the data for the scaling operation. In addition, memory is also required for delivering the scaled data to the shared resource when the shared resource has an access latency. This means that the two functions are implemented with redundant memory. The redundant memory typically increases the memory cost of the system, which in turn increases the system cost.

SUMMARY OF THE INVENTION

One feature of the present invention is to minimize memory required for a data scaling function and a data buffering function.

Another feature of the present invention is to integrate the data scaling and buffering functions together such that memory cost for both functions can be minimized.

A scaling circuit residing on a single semiconductor substrate includes a buffer for storing a plurality of partially scaled data. A multiplier is provided for multiplying a weight signal with each of a plurality of input data to produce a plurality of weighted data. An adder is coupled to (1) the multiplier and (2) the buffer for adding each of the weighted data to one of the partially scaled data to produce a plurality of scaled data. When the first one of the scaled data is produced by the adder, the first one of the scaled data can remain in the buffer until displaced by a new data such that the scaling circuit is directly coupled to an external bus without requiring any external buffering memory coupled in between.

In a data processing system having a plurality of components and a bus for transferring data among the components, a method of scaling a block of data into a plurality of scaled data and for transferring the scaled data to one of the components via the bus is also described. A plurality of partially scaled data are stored in a buffer that is coupled to the bus. A weight signal is multiplied with each of a plurality of input data to produce a plurality of weighted data. Each of the weighted data is then sequentially added in an adder to one of the partially scaled data to produce the scaled data. It is then detected if the bus is available for transferring the scaled data while the scaled data is produced. The bus is not available for the scaling circuit when the bus is engaged in data transfer for other components coupled to the bus. The scaled data are then transferred to the bus if the bus is available. The scaled data are stored in the buffer before transferring the scaled data to the bus if the bus is not available. When a first one of the scaled data is produced, the first one of the scaled data can remain in the buffer before being transferring to the bus until displaced by a new data to be scaled without requiring any buffering memory coupled between the bus and the adder.

BRIEF DESCRIPTION OF THE DRAWINGS

The present invention is illustrated by way of example and not limitation in the figures of the accompanying drawings, in which like references indicate similar elements and in which:

FIGS. 8A and 8B show the contents stored in each of the line buffers of FIG. 7 at different timings.

DETAILED DESCRIPTION

Figure 1:
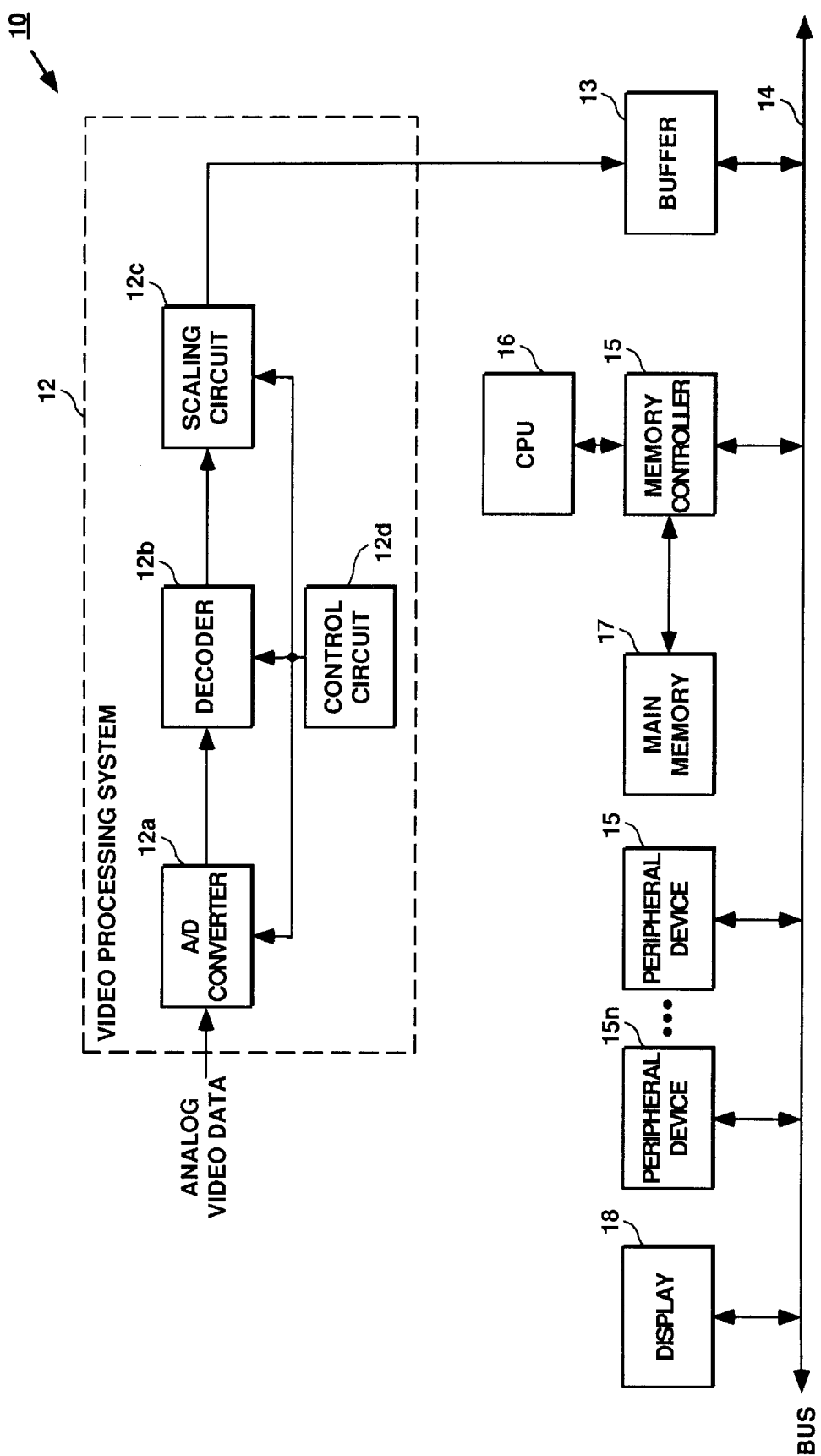
FIG. 1 is a block diagram of a prior art computer system that includes a video processing system and a buffer for coupling the video processing system to a bus of the computer system.
Figure 2:
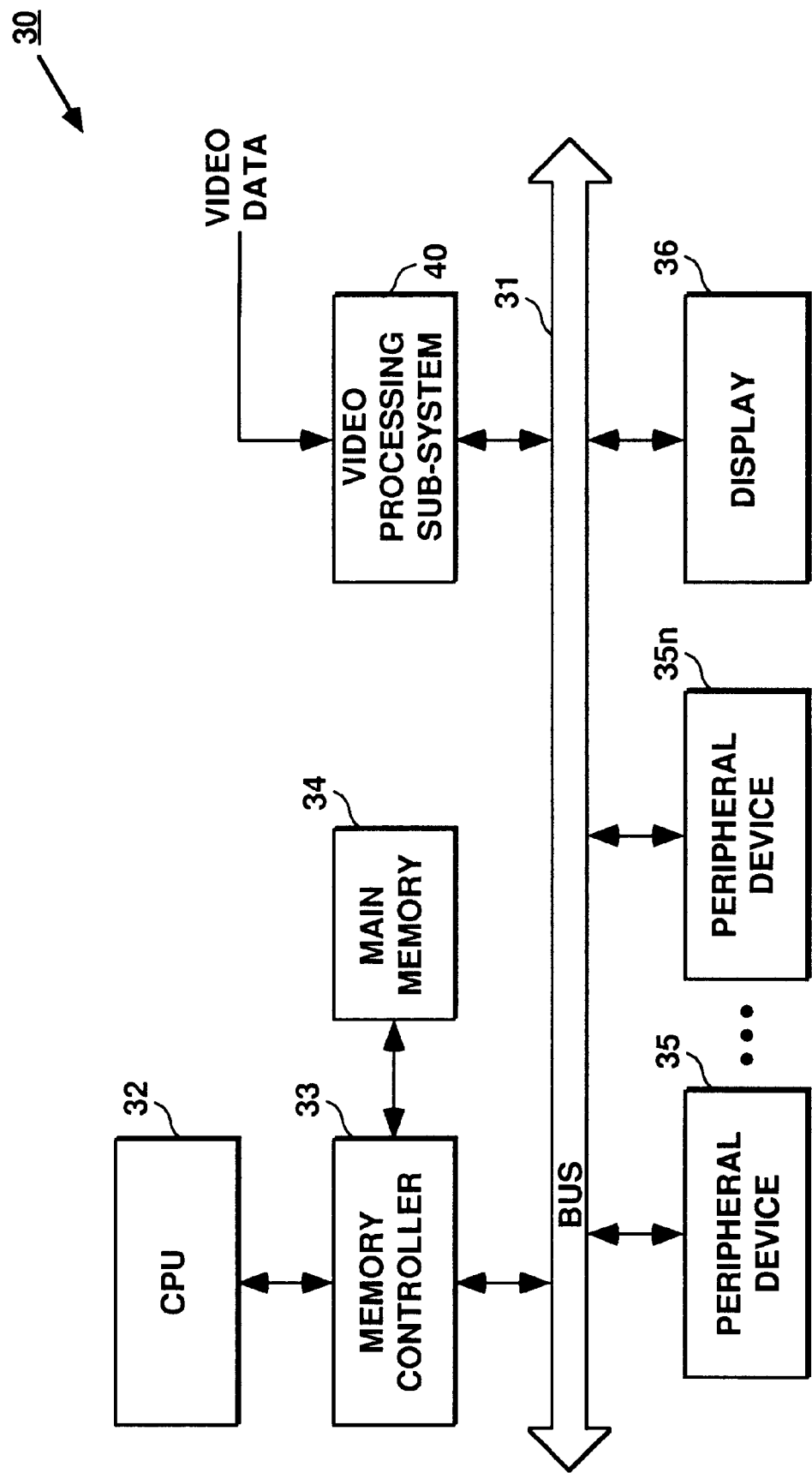
FIG. 2 is a block diagram of a computer system that includes a video processing sub-system coupled directly to a bus of the computer system in accordance with one embodiment of the present invention.

FIG. 2 shows in block diagram of a computer system 30 that implements an embodiment of the present invention. As shown in FIG. 2, computer system 30 includes a video processing sub-system 40 that is directly connected to a bus 31 of computer system 30. Video processing sub-system 40 and its direct connection to bus 31 will be described in more detail below, in conjunction with FIGS. 3 through 8B.

Referring again to FIG. 2, bus 31 of computer system 30 is also connected to a central processing unit (CPU) 32 via a memory controller 33. Memory controller 33 is also connected to a memory 34. Bus 31 is further connected to a number of peripheral devices/controllers 35 through 35n. The peripheral devices connected to bus 31 may include a display, a frame buffer, an expansion bus interface, a communication controller, and a hard disk drive. The peripheral devices connected to bus 31 may also include other devices and/or controllers.

Bus 31 can be any kind of known bus system. For one embodiment, bus 31 is a peripheral component interconnect ("PCI") bus system. Alternatively, bus 31 can be an ISA (Industry Standard Architecture) bus system, an EISA (Extended ISA) bus system, or a Micro Channel bus system.

Bus 31 can transfer data between any two components connected to bus 31. Bus 31 includes a bus controller (not shown) that controls and manages data transfer activities occurred across bus 31, including arbitrating for bus access among the components that are requesting for such access and monitoring when bus 31 is idle. The bus controller can be any known bus controller. When bus 31 is transferring data between any two components connected to bus 31, bus 31 is not available to transfer data for other components that are also connected to bus 31. Bus 31 can only be made available to transfer data for those components after it finishes its current data transfer. This is referred to as bus access latency. When bus 31 is not available for a component to send its data while the data are ready in that component to be transferred, the data have to be stored in a buffer in order to maintain data integrity of the data to be transferred. This is especially the case when the component cannot stop transferring data to bus 31 and has to move the data to the bus at a fixed transfer rate.

As described above and in accordance with one embodiment of the present invention, video processing sub-system 40 is directly connected to bus 31 without requiring any buffering circuit connected in between that would otherwise be required to mitigate the access latency of bus 31. This minimizes memory required for computer system 30, which in turn minimizes memory cost of system 30. The direct connection between bus 31 and video processing system 40 in accordance with one embodiment of the present invention will be described in more detail below, in conjunction with FIGS. 3–8B.

Referring again to FIG. 2, video processing sub-system 40 provides video processing ability for computer system 30. This in turn allows computer system 30 to conduct video conference with a remote computer system over an external communication link (not shown). Video processing sub-system 40 receives an analog video image signal from an external video camera. The analog video signal is then processed by video processing sub-system 40 to be digital video bit stream. The video bit stream is then sent via bus 31 at a certain transfer rate to a display 36 connected to bus 31 or to memory 34. Memory 34 then sends the video bit stream to display 36 via bus 31. In addition, the video bit stream can also be sent to one of peripheral devices 35–35n that is connected to the remote computer via the communication link for video conference. The structure and function of video processing sub-system 40 will be described in more detail below, also in conjunction with FIGS. 3–8B.

Figure 3:
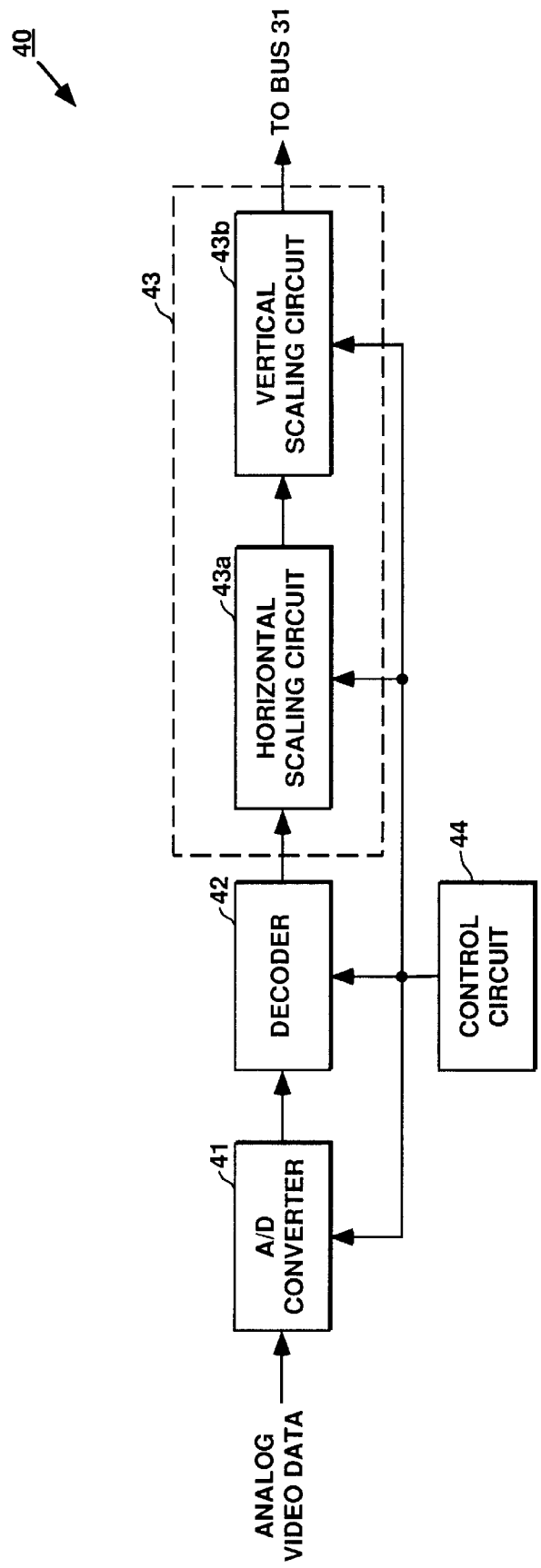
FIG. 3 is a block diagram of the video processing sub-system of FIG. 2, wherein the video processing sub-system includes a converter, a decoder, and a scaling circuit.

Referring to FIG. 3, video processing sub-system 40 includes an A/D (analog-to-digital) converter 41. Converter 41 converts the analog video signal received from the external video camera into digital video bit stream. Alternatively, the external video camera is a digital video camera. When the external video camera is a digital video camera, video processing sub-system 40 does not include converter 41 and the video signal from the camera is the digital video bit stream.

The digital video bit stream from converter 41 includes a series of video image frames. Each frame includes a matrix of pixels with pixel intensity values for the corresponding image sensed by the video camera, and pixel color values from the corresponding image scene. The pixels of an image frame are presented along scan lines.

The digital video bit stream is then applied to a decoder 42 of video processing sub-system 40. Decoder 42 is used to decode color, timing, and other control information from the digital video bit stream. The decoded video bit stream is then sent to a scaling circuit 43 for scaling down the size of each image frame.

As is known, a video image frame is comprised of a matrix of pixels. Each pixel has brightness and color information associated. The pixels are presented first in raster (i.e., horizontal) order, and then in vertical order (i.e., in scanning order). In order for scaling circuit 43 to scale down the size of a video image frame in two dimensions, the number of pixels for an image frame need to be reduced both horizontally and vertically. For example, if the image frame needs to be scaled down in half, the number of pixels of the scaled frame will be only one fourth of the number of pixels of the original image frame. However, if scaling circuit 43 simply decimates every adjacent pixel and adjacent scan line to reduce the number of pixels, the scaled image frame looses image details and generates aliasing. Therefore, in order to properly reduce the number of pixels of a video image frame, scaling circuit 43 needs to smooth the pixels first. In one embodiment, the smoothing operation generates a new matrix of pixels, each being produced in accordance with a number of pixels of the original image frame. In other words, the smoothing operation is essentially a lowpass digital filtering operation. As is known, the more pixels used by a filter to generate a new pixel, the better the smooth quality. The new pixels then go through a decimation operation to simply reduce the number of the new pixels. In another embodiment, the smoothing and decimation operations can be a single operation.

Because the pixels for a video image frame are presented in raster order first and then in vertical order (i.e., in scanning order), a horizontal smoothing operation and a vertical smoothing operation are needed to smooth the pixels. The horizontal smoothing operation is performed along each horizontal line of pixels and the vertical smoothing operation is performed along each vertical line of pixels. Then a horizontal decimation operation and a vertical decimation operation are performed to reduce the number of pixels both horizontally and vertically. For one embodiment, the horizontal decimation operation follows the horizontal smoothing operation and the vertical smoothing operation follows the horizontal decimation operation. The vertical smoothing operation is then followed by the vertical decimation operation. For another embodiment, the horizontal smoothing and decimation operation are integrated as a single operation and the vertical smoothing and decimation operations are integrated as a single operation.

Scaling circuit 43 includes a horizontal scaling circuit 43a and a vertical scaling circuit 43b. Horizontal scaling circuit 43a scales down the video image frame in horizontal order. This means that horizontal scaling circuit 43a reduces the number of pixels along each of scan lines to scale down the image frame horizontally. Vertical scaling circuit 43b scales down the video image frame in vertical order. This means that vertical scaling circuit 43b scales down the image by reducing the number of scan lines of the video image frame. Each of scaling circuits 43a and 43b contains a buffering circuit (shown in FIGS. 4 and 7) for the scaling operation. The buffering circuit is used in each of scaling circuits 43a and 43b to buffer pixels for the smoothing operation. The smoothing operation and scaling circuits 43a and 43b will be described in more detail below, in conjunction with FIGS. 3–8B.

In FIG. 3, video processing sub-system 40 also includes a control circuit 44 that is connected to each of circuits 41 through 43. Control circuit 44 controls the operation of each of circuits 41–43 of video processing sub-system 40. Control circuit 44 also controls the data transfer among circuits 41–43. Control circuit 44 can be implemented by any known control circuit of a video processing system.

For one embodiment, video processing sub-system 40 resides on a single semiconductor substrate. For another embodiment, scaling circuit 43 resides on a single semiconductor substrate. Video processing sub-system 40 may include other video processing functions or circuits. For example, video processing sub-system 40 may include a data compression/decompression circuit and an error detection circuit.

As described above, video processing sub-system 40 is directly connected to bus 31. This means that the output of vertical scaling circuit 43b is directly connected to bus 31 without requiring any FIFO buffering circuit in between. This means that scaling circuit 43 combines the buffering circuit required for the bus access latency of bus 31 with its own buffering circuit required for the scaling operation, thus minimizing the memory cost required for the scaling and latency buffering. Moreover, because scaling circuit 43 includes the buffering memory for its scaling operation, this automatically provides a deep buffer at no incremental cost to system 30. This advantage is particularly attractive in systems that have unpredictable access latency periods and cannot tolerate the cost associated with a rather large storage buffer.

Figure 4:
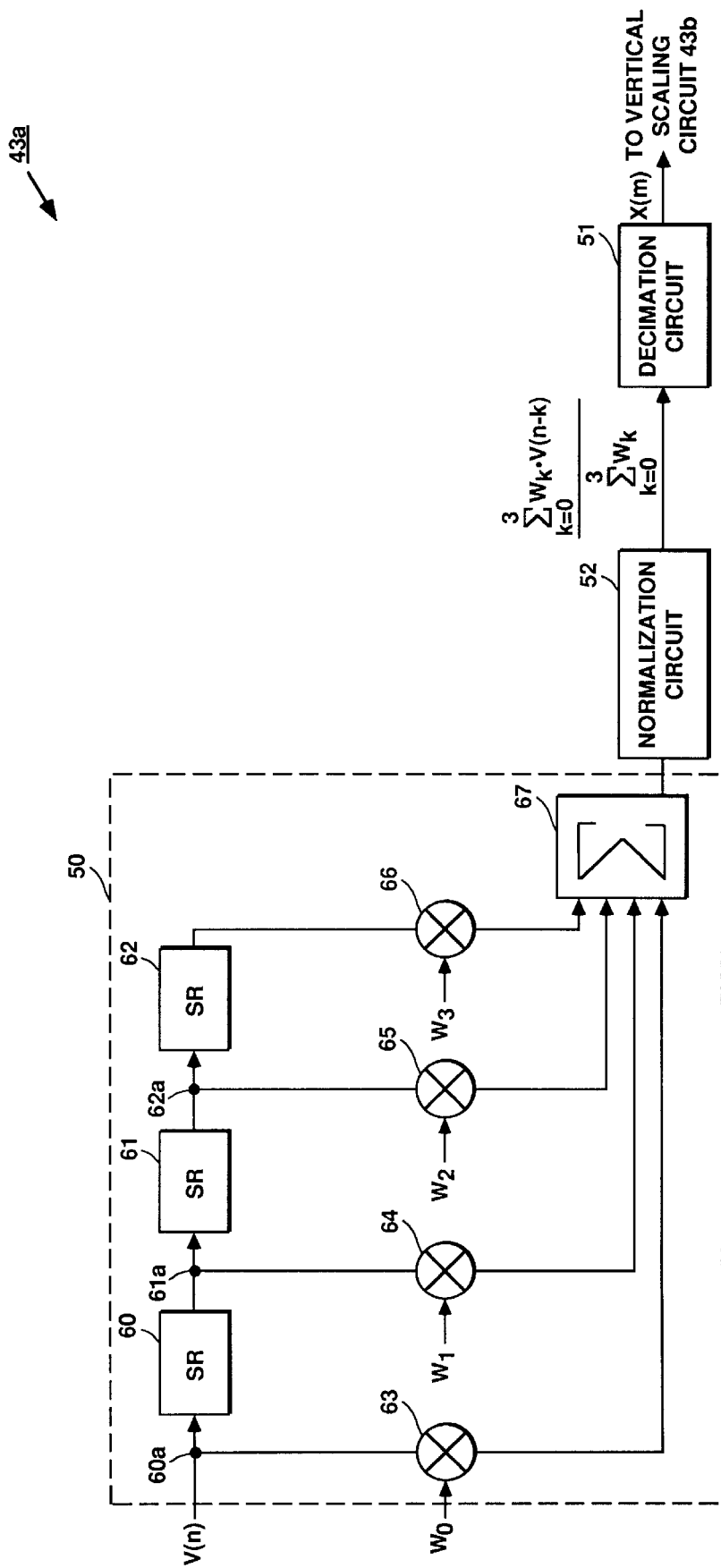
FIG. 4 shows a horizontal scaling circuit of the scaling circuit of FIG. 3.
Figure 5:
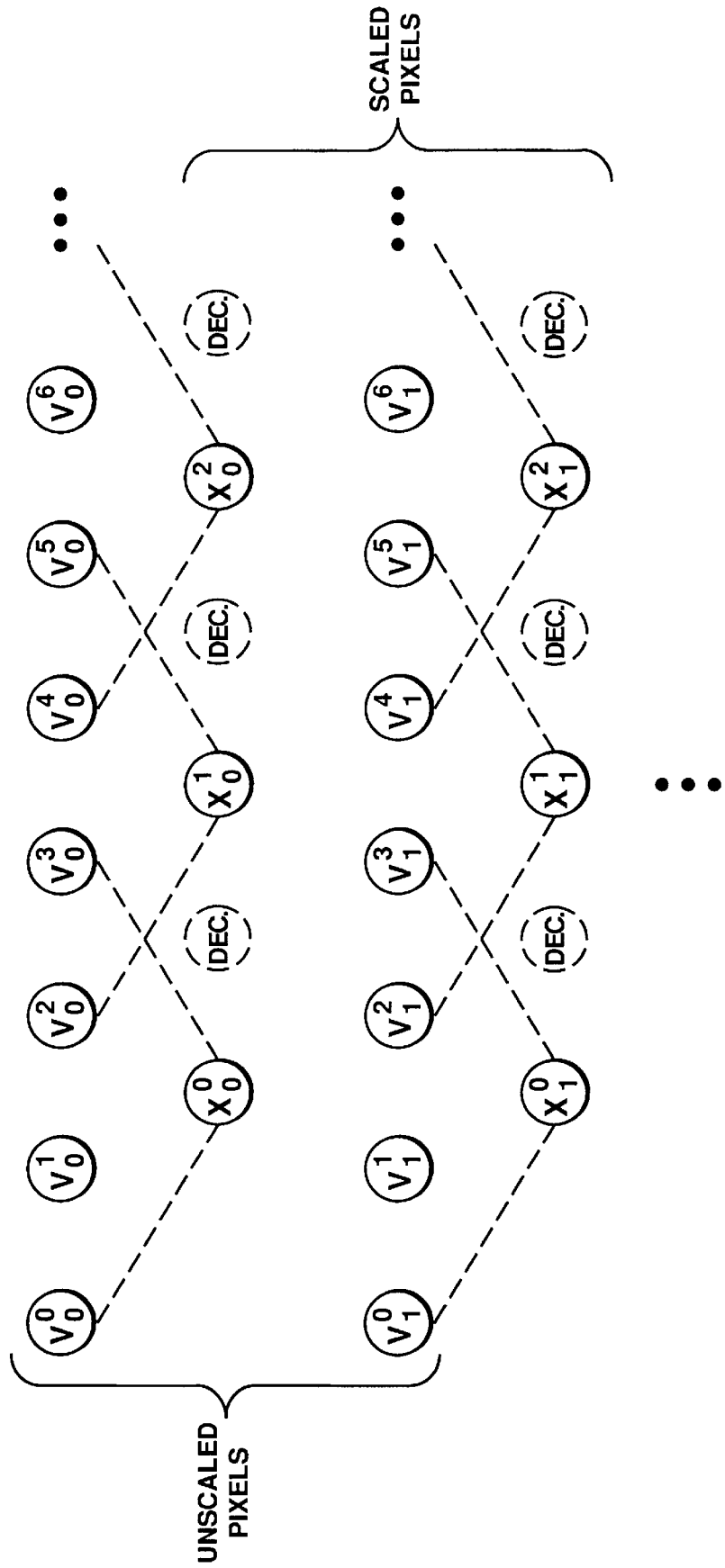
FIG. 5 shows scans of video image pixels before passing through the horizontal scaling circuit and the scaled scans of video image pixels from the horizontal scaling circuit.
Figure 6:
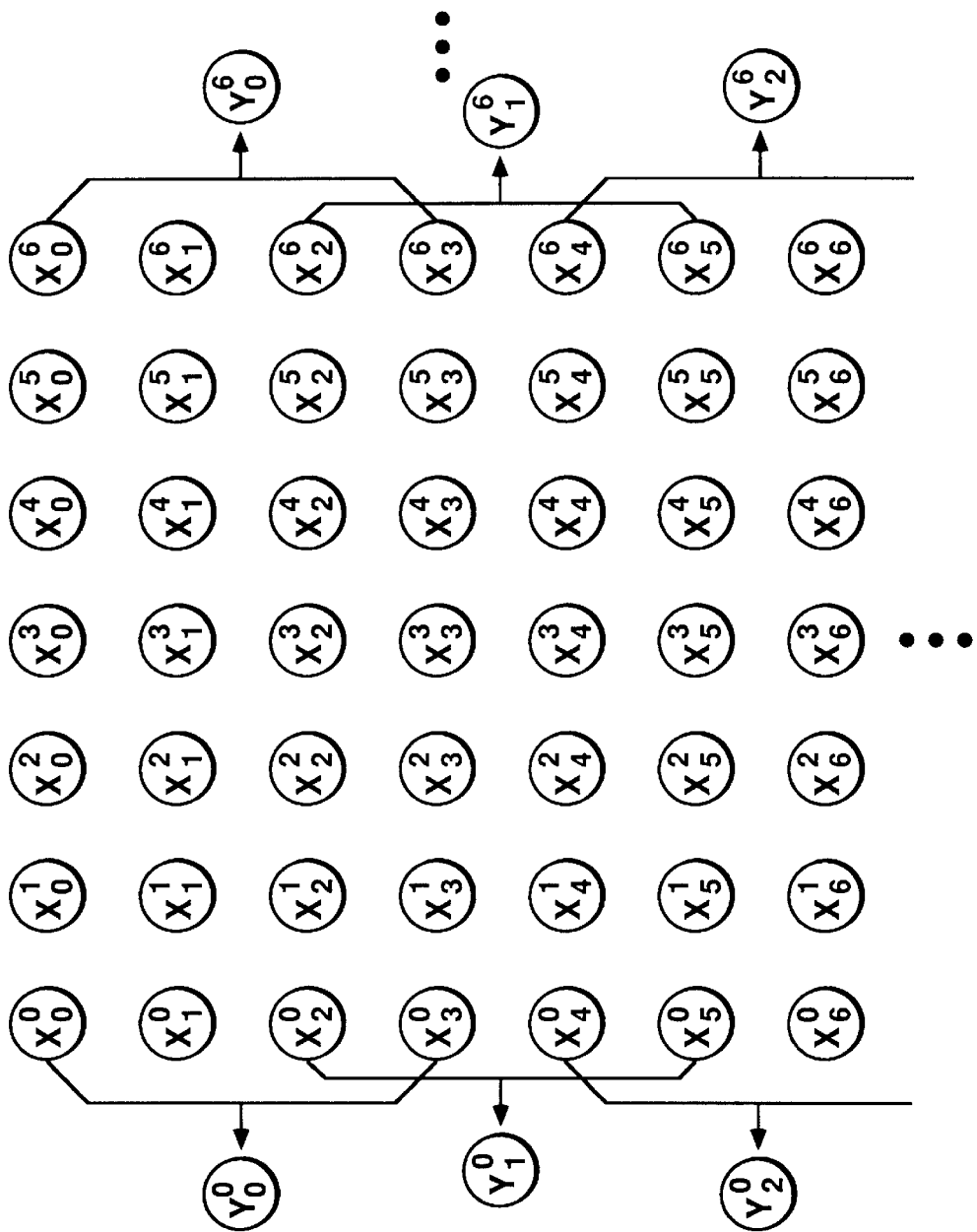
FIG. 6 shows the pixel map of a scaled video image after the horizontal scaling circuit.

FIG. 4 shows the circuit of one embodiment of horizontal scaling circuit 43a that includes a smooth circuit 50 for smoothing the pixels along the raster order. Horizontal scaling circuit 43a also includes a decimation circuit 51 that simply reduces the number of smoothed pixels along raster order, and a normalization circuit 52 for normalizing the smoothed pixels from smooth circuit 50. The function of normalization circuit 52 is to divide the output of circuit 50 with a sum of the weight signals applied to circuit 50. Normalization circuit 52 can be implemented by any known normalization circuit. FIG. 5 shows the process and result of the smoothing and decimation operations of horizontal scaling circuit 43a. FIG. 6 shows the pixel map of the pixels after the horizontal scaling operation by horizontal scaling circuit 43a. FIG. 6 also shows how vertical scaling circuit 43b reduces the number of pixels vertically. It is to be noted that horizontal scaling circuit 43a only scales down the number of pixels along scan lines and does not reduce the number of scan lines (i.e., does not reduce the number of pixels vertically). Vertical scaling circuit 43b performs the vertical scaling function to reduce the number of scan lines. Vertical scaling circuit 43b and its operation will be described in more detail below, in conjunction with FIGS. 7–8B.

As can be seen from FIGS. 4–6, because the smoothing operation is essentially a lowpass filtering operation, a number of pixels are typically required for smooth circuit 50 to generate an output pixel. This causes smooth circuit 50 to require buffering circuit to store input pixels. As can be seen from FIG. 4, smooth circuit 50 includes shift registers 60 through 62 connected in series to the input of circuit 43a. Registers 60–62 are used to store three of the input pixels V(n) to be multiplied with a three weight signals to generate an output pixel. When the fourth input pixel is applied to the input of scaling circuit 43a, shift registers 60–62 apply the stored pixels to multipliers 64–66.

The input pixels V(n) for the scaling operation sequentially pass through each of registers 60–62 via the input of circuit 43a. The input pixels V(n) are sequentially applied to the input of circuit 43a. Alternatively, the input pixels V(n) for generating one smoothed pixel can be applied to registers 60–62 at the same time. When this occurs, an additional shift register is required.

In addition, multipliers 63 through 66 are provided in circuit 43a to connect to the input of scaling circuit 43a and to the outputs of registers 60–62, respectively. Each of multipliers 63–66 is applied with one of weight (i.e., coefficient) signals $W_0$ through $W_3$. The output of each of multipliers 63–66 is then connected to a sum circuit 67. The output of sum circuit 67 is then applied to decimation circuit 51 via normalization circuit 52.

As can be seen from FIG. 4, smooth circuit 50 performs the horizontal smoothing operation in a pipelined fashion. This means that the smoothed pixels can only be generated sequentially. This allows decimation circuit 51 to selectively decimate the smoothed pixels.

As can be seen from FIG. 4, registers 60–62 serve as the buffering circuit of smooth circuit 50 to store pixels for the smoothing operation. Alternatively, smooth circuit 50 may include more or fewer registers to store more or fewer pixels to generate a smoothed pixel. As also can be seen from FIG. 4, smooth circuit 50 is essentially a direct form finite impulse response ("FIR") filter circuit. Smooth circuit 50 can also be implemented by other types of filter circuits. For example, smooth circuit 50 can be implemented by a transposed form FIR filter circuit.

The operation of a FIR filter is known in the art and will not be described in more detail below. In addition, the determination of the weight signals $W_0$ through $W_3$ is also known in the art. It is, however, desired that in one embodiment of the present invention, the sum of the weight signals $W_0$ through $W_3$ (i.e., the total value of the weight signals $W_0-W_3$) should be a power of 2 to allow the normalization to be performed with a shift rather than a full divide. For one embodiment, the weight signals $W_0-W_3$ can be selected respectively as one, seven, seven, and one.

FIG. 5 shows the unscaled pixels and the scaled pixels by scaling circuit 43a. The unscaled pixels are represented by the letter "V" and the scaled pixels are represented by the letter "X". The decimated pixels are represented by broken line circles labeled with the symbol "DEC." The symbol "$V_0^1$" indicates the second unscaled pixel along the first scan line and the symbol "$V_1^3$" indicates the fourth unscaled pixel along the second scan line. Similarly, the symbol "$X_1^0$" indicates the first scaled pixel along the second scan line. FIG. 6 shows the entire matrix of scaled pixels from horizontal scaling circuit 43a. The scaled pixels X(m) are then applied in raster order to vertical scaling circuit 43b (FIG. 3) for vertical scaling.

As can be seen from FIG. 5, decimation circuit 51 of horizontal scaling circuit 43a decimates every other smoothed pixels. This reduces the number of smoothed pixels along scan lines in half. Alternatively, decimation circuit 51 may decimate the pixels at a different ratio. For example, decimation circuit 51 may decimate one pixel in every three pixels.

As can be seen from FIG. 6, vertical scaling circuit 43b scales down the frame in half by reducing the scan lines in half. It shall be noted that FIG. 6 only illustrates one example of scaling down a frame. Alternatively, other scaling ratios may be employed.

Figure 7:
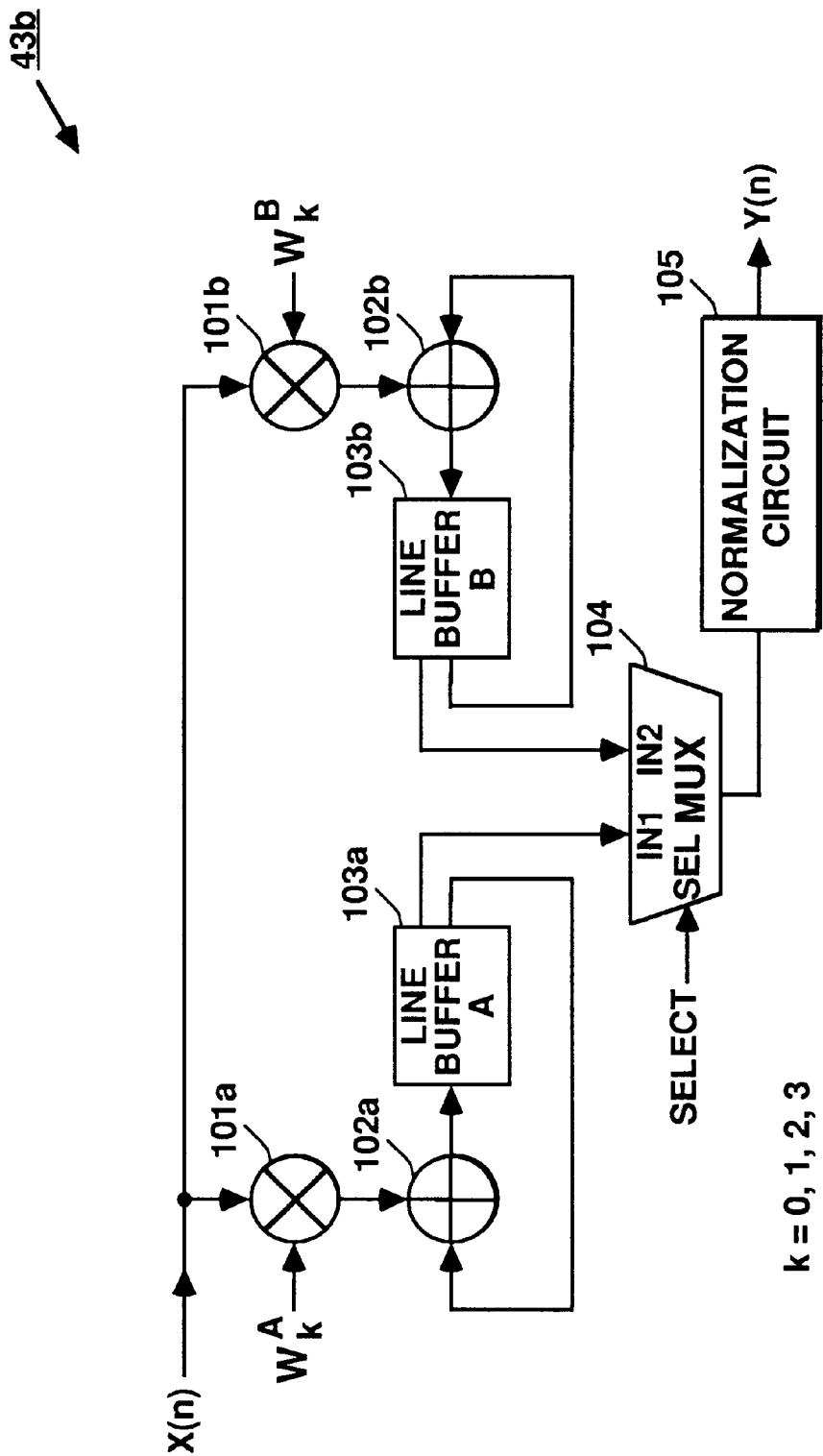
FIG. 7 is a block diagram of a horizontal scaling circuit of the scaling circuit of FIG. 3.

Referring to FIG. 7, vertical scaling circuit 43b includes two line buffers 103a and 103b, two adders 102a and 102b, and two multipliers 101a and 101b. In addition, scaling circuit 43b includes a multiplexer 104. Multipliers 101a and 101b are connected to the input of circuit 43b. Multiplier 101a also receives a series of weight signals $W_K^A$ and multiplier 101b receives a series of weight signals $W_K^B$, wherein k can be 0, 1, 2, and 3. The output of multiplier 101a is connected to adder 102a and the output of multiplier 101b is connected to adder 102b. Adder 102a has its output connected to line buffer 103a and adder 102b has its output connected to line buffer 103b. The output of line buffer 103a is again connected to adder 102a as an input and the output of line buffer 103b is again connected to adder 102b as an input. Line buffers 103a and 103b also have their respective outputs connected to multiplexer 104. Multiplexer 104 selectively connect the output of one of buffers 103a and 103b to its output. The output of multiplexer 104 is connected to a normalization circuit 105.

For one embodiment, each of weight signals $W_0^A$ through $W_3^A$ is equal to each of weight signals $W_0^B$ through $W_3^B$. For another embodiment, each of multipliers 101a and 101b can receive more or fewer than four weight signals.

FIG. 7 shows one arrangement of normalization circuit 105. Other arrangements of normalization circuit 105 can also be employed. For example, a normalization circuit can be placed between adder 102a and line buffer 103a and another normalization circuit can be placed between adder 102b and line buffer 103b. As a further example, a normalization circuit can be placed between line buffer 103a and multiplexer 104 and a normalization circuit can be placed between line buffer 103b and multiplexer 104.

As can be seen from FIG. 7, the circuit structure formed by circuits 101a through 103a is identical to that of circuits 101b through 103b. The weight signals $W_0^B-W_3^A$ are, however, not applied to multiplier 101b at the same time when the weight signals $W_0^A-W_3^A$ are applied to multiplier 101a. For one embodiment as shown in FIG. 6, circuit 43b causes the weight signals $W_0^B-W_3^B$ to be delayed for two scan lines of pixels. By doing this, line buffers 103a and 103b can function in a ping-pong fashion to alternately generate pixels of the scaled scan lines. By having duplicate sets of circuits 101a–103a and 101b–103b in vertical scaling circuit 43b, circuit 43b has a filter function which spans two scaled output pixels. Alternatively, the number of duplicate sets of circuits in circuit 43b can be more or fewer than two to alter the span of the filter function of circuit 43b. Circuit 43b integrates the vertical pixel smoothing function with the pixel decimation function together.

Each of line buffers 103a and 103b includes a number of storage locations. The number of storage locations in each of line buffers 103a–103b correspond to the number of horizontally scaled pixels of one scan line. This is why buffers 103a and 103b are referred to as line buffers. Each of line buffers 103a and 103b can store an entire scan line of scaled pixels. This is required because vertical scaling requires filters on adjacent vertical pixels which occur a scan line apart in time.

In one embodiment, each of line buffers 103a–103b includes a number of registers. In another embodiment, each of line buffers 103a–103b can be implemented by a memory.

Referring to FIGS. 6 through 8B, during operation, when the first scan line of pixels $X_0^0$ through $X_0^n$ are applied to scaling circuit 43b, multiplier 101b does not function and line buffer 103b does not store any pixels. Meanwhile, multiplier 101a sequentially multiplies the first weight signal $W_0^A$ to each of the pixels $X_0^0$ through $X_0^n$ and stores the weighted pixels in line buffer 103a through adder 102a (see FIG. 8A). As can be seen from FIG. 8A, at timing $T_2$, each of the weighted pixels $W_0^A X_0^0$ through $W_0^A X_0^n$ is stored in one of storage locations LOC0 through LOCn of line buffer 103a. Then the second scan line of pixels $X_1^0$ through $X_1^n$ are applied to multipliers 101a and 101b. When this occurs, multiplier 101b still does not function and line buffer 103b still does not receive anything from adder 102b.

Multiplier 101a meanwhile receives another weight signal $W_1^A$ and multiplies each of the pixels $X_1^0$ through $X_1^n$ with the $W_1^A$ weight signal. The weighted pixels $W_1^A X_1^0$ through $W_1^A X_1^n$ are sequentially applied to adder 102a as they come from multiplier 101a. Adder 102a adds each of weighted pixels $W_1^A X_1^0$ with its corresponding weighted pixel of the previous scan line. For example, adder 102a adds weighted pixel $W_1^A X_1^0$ to weighted pixel $W_0^A X_0^0$ and weighted pixel $W_1^A X_1^n$ to weighted pixel $W_0^A X_0^n$ (see FIG. 8A, at timing T3). The added results are then again stored in line buffer 103a. The added results are referred to as partially scaled data or pixels hereinafter.

When a third scan line of pixels $X_2^0$ through $X_2^n$ are applied to multipliers 101a and 101b, multiplier 101a multiplies the third weight signal $W_2^A$ to each of the pixels $X_2^0$ through $X_2^n$ and adder 102a sequentially adds each of the weighted pixels $W_2^A X_2^0$ through $W_2^A X_2^n$ to its corresponding partially scaled pixels $W_0^A X_0^0-W_0^A X_0^n$ and $W_1^A X_1^0-W_1^A X_1^n$. For example, as can be seen from FIG. 8A, adder 102a adds weighted pixel $W_2^A X_2^0$ to partially scaled pixels $W_1^A X_1^0+W_0^A X_0^n$. The added sums are then stored back into each of storage locations LOC0 through LOCn of line buffer 103a.

Meanwhile, multiplier 101b starts to multiply each of pixels $X_2^0$ through $X_2^n$ with the weight signal $W_0^B$. The weighted pixels $W_0^B X_2^0$ through $W_0^B W_2^n$ are then stored in each of storage locations LOC0 through LOCn of line buffer 103b via adder 102b (see FIG. 8B at timings $T_{3a}$ and $T_4$).

Next, when the fourth scan line of pixels $X_3^0$ through $X_3^n$ are applied to scaling circuit 43b, multiplier 101a multiplies the pixels $X_3^0$ through $X_3^n$ with the fourth weight signal $W_3^A$. The weighted pixels $W_3^A X_3^0$ through $W_3^A X_3^n$ are then applied to adder 102a to be added with the partially scaled data of storage locations LOC0 through LOCn to sequentially produce a scaled scan line of pixels $Y_0^0$ through $Y_0^n$ before normalization (see FIGS. 6 and 8A). As can be seen from timings T5 through T7, line buffer 103a sequentially receives each of the scaled scan line of pixels $Y_0^0$ through $Y_0^n$ (before normalization). For example, at timing T5, the first scaled scan line pixel $Y_0^0$ (before normalization) (i.e., $X_0^0 W_0^A + X_1^0 W_1^A + X_2^0 W_2^A + X_3^0 W_3^A$) is produced and stored in storage location LOC0 of line buffer 103a and is available for immediate transfer. When this occurs, the SELECT signal causes multiplexer 104 to connect its IN1 input to its output. The first pixel $Y_0^0$ (before normalization) can be stored in line buffer 103a until timing T7. At timing T7, the data of a new pixel are produced and stored in location LOC0 of line buffer 103a.

As can be seen from FIG. 8A, line buffer 103a starts to serve also as the bus access latency buffer for bus 31 at timing T5 and finishes to serve as the bus access latency buffer for bus 31 at timing T8. When this occurs, line buffer 103a remains as the storage means for the vertical scaling operation. By this arrangement, the bus access latency buffering requirement is achieved without requiring addition buffering memory connected between scaling circuit 43b and bus 31.

Meanwhile, multiplier 101b continues its multiplication of the pixels $X_3^0$ through $X_3^n$ with its second weight signal $W_1^B$ and adder 102b sequentially adds the weighted pixels $W_1^B X_3^0$ through $W_1^B X_3^n$ with each of the weighted pixels $W_0^B X_2^0$ through $W_0^B W_2^n$. The added sums (i.e., partially scaled pixels) are then again stored in line buffer 103b, as shown in FIG. 8B.

As can be seen from FIG. 8B, line buffer 103b starts to store the first pixel $Y_1^0$ of the second scaled scan line at timing T9 when the sixth scan line of input pixels are applied to scaling circuit 43b. The first scaled pixel $Y_1^0$ (before normalization) (i.e., $X_2^0 W_0^B + X_3^0 W_1^B + X_4^0 W_2^B + X_5^0 W_3^B$) can be buffered in line buffer 103b until timing T11. The SELECT signal now causes multiplexer 104 to connect its IN2 input to its output. At timing T10, the entire second scaled scan line of pixels (before normalization) are produced and stored in line buffer 103b. Again, as can be seen from FIG. 8B, line buffer 103b serves as the bus access latency buffer for bus 31 for the first scaled pixel $Y_1^0$ (before normalization) from timing T9 to timing T11. When this occurs, however, line buffer 103b still remains as the storage buffer for the vertical scaling operation.

As described above, by proving line buffers 103a and 103b in vertical scaling circuit 43b, the bus access latency buffering of bus 31 can be achieved without requiring any buffering memory connected between scaling circuit 43b and bus 31. This minimizes the total memory required for the vertical scaling and bus access latency buffering functions.

As described above, line buffers 103a and 103b operate in an overlapping and ping-ponged fashion to alternately produce the scaled scan lines of pixels. As described above, line buffer 103a can output the first scaled scan line of pixels when line buffer 103 is in the process of producing the second scaled scan line of pixels.

Alternatively, the storage usage of line buffers 103a–103b can be optimized by increasing bits per partial result when reducing the number of horizontal pixels, or vice versa, especially when maintaining aspect ratio while scaling.

In addition, line buffers 103a and 103b of FIG. 7 can be implemented by a single memory circuit. In this case, line buffers 103a and 103b can efficiently share memory space during the overlap of the peak usage of one buffer and the non-peak usage of the other buffer.

Moreover, line buffers 103 and 103b can be combined to double the horizontal storage space while reducing the filter span. This is particularly useful for low scaling ratios which are less sensitive to filter overlap, but require more horizontal storage.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A video scaling circuit residing on a single semiconductor substrate comprising, in combination:

horizontal scaling means for scaling video pixel data in horizontal order to produce horizontally-scaled pixel data; and vertical scaling means comprising:

first and second multiplication means for multiplying said horizontally-scaled pixel data with a series of predetermined coefficients to produce weighted horizontally-scaled pixel data;

first and second addition means each connected to the output of the corresponding multiplication means for adding said weighted, horizontally-scaled pixel data;

first and second storage means each connected to the output of the corresponding addition means to store a sum of successive rows of said weighted, horizontally-scaled pixel data, the second storage means being time-shifted in operation from the first storage means by a predetermined amount of time;

selection means connected to the outputs of said first and second storage means to alternatively select between the respective outputs of said first and second storage means; and normalization means connected to the output of said selection means to divide said weighted, horizontally-scaled pixel data by a value equal to the sum of said predetermined coefficients.

2. A video scaling circuit as claimed in claim 1 wherein said horizontal scaling means comprises:

pixel smoothing means for filtering said video pixel data in horizontal order to produce horizontally-smoothed pixel data; and decimation means for reducing the number of said horizontally-smoothed pixel data by a predetermined factor.

3. A video scaling circuit as claimed in claim 1 wherein said horizontal scaling means comprises:

an input for receiving said video pixel data;

a plurality of storage means connected in series to said input for storing said video pixel data;

a plurality of multiplication means with one said multiplication means connected to said input and the remaining said multiplication means connected to each of the outputs of said plurality of storage means for multiplying said video pixel data by a plurality of predetermined weight signals;

summation means connected to the outputs of said plurality of multiplication means for summing the products of said predetermined weight signals and said video pixel data;

normalization means connected to the output of said summation means for dividing the output of said summation means by the sum of said plurality of weight signals and outputting a plurality of horizontally-smoothed pixel data; and decimation means receiving the result from said normalization means and reducing the number of horizontally-smoothed pixel data by a predetermined factor to produce horizontally-scaled pixel data.

4. A video scaling circuit residing on a single semiconductor substrate comprising, in combination:

a horizontal scaling circuit for scaling video pixel data in horizontal order to produce horizontally-scaled pixel data; and a vertical scaling circuit comprising:

dual multiplication circuits for multiplying said horizontally-scaled pixel data by a series of predetermined coefficients to produce weighted, horizontally-scaled pixel data;

dual addition circuits, each said addition circuit connected to the output of each said multiplication circuit for summing lines of said weighted, horizontally-scaled pixel data;

first and second storage devices each connected to the output of the corresponding addition circuit to store a sum of successive lines of weighted, horizontally-scaled pixel data, the second storage device being time-shifted in operation from the first storage device by a predetermined amount of time;

a multiplexer connected to the outputs of said storage devices to alternatively select between each said output; and a normalization circuit connected to the output of said multiplexer for normalizing said weighted, horizontally-scaled pixel data by a value equal to the sum of said predetermined coefficients.

5. A video scaling circuit as claimed in claim 4 wherein said horizontal scaling circuit comprises:

a smooth circuit for filtering said video pixel data in horizontal order to produce horizontally-smoothed pixel data; and a decimation circuit for reducing the number of said horizontally-smoothed pixel data by a predetermined factor.

6. A video scaling circuit as claimed in claim 4 wherein said horizontal scaling circuit comprises:

an input for receiving said video pixel data;

a plurality of registers connected in series to said input for buffering said video pixel data;

a plurality of multipliers with one said multiplier connected to said input and the remaining said multipliers connected to the outputs of said plurality of registers for multiplying said video pixel data by a plurality of predetermined weight signals;

a summation circuit connected to the outputs of said plurality of multipliers for summing the products of said predetermined weight signals and said video pixel data;

a normalization circuit connected to the output of said summation circuit for dividing the output of said summation circuit by the sum of said plurality of weight signals and outputting a plurality of horizontally-smoothed output pixel data; and a decimation circuit connected to the output of said normalization circuit for reducing the number of horizontally-smoothed pixel data by a predetermined factor and outputting horizontally-scaled pixel data.

7. A method for scaling video pixel data comprising:

horizontally scaling said video pixel data to produce horizontally-scaled video pixel data; and vertically scaling said horizontally-scaled pixel data, said vertically scaling comprising:

multiplying said horizontally-scaled pixel data by a series of predetermined coefficients to produce weighted, horizontally-scaled pixel data;

adding said weighted, horizontally-scaled pixel data from one horizontal row of said video pixel data with weighted, horizontally-scaled pixel data from a predetermined number of adjacent rows to produce a sum of successive rows of weighted, horizontally-scaled pixel data;

storing the sum of successive rows of weighted, horizontally-scaled pixel data in a first storage location and a second storage location, the second storage location being time-shifted from the first storage location by a predetermined amount of time;

alternatively selecting between the output of each said storage location; and dividing the output of each said storage location by a value equal to the sum of said coefficients.

8. A method for scaling video pixel data as claimed in claim 7 wherein horizontally scaling said video pixel data comprises:

smoothing said video pixel data in horizontal order to produce horizontally-smoothed pixels; and reducing the number of said horizontally-smoothed pixels by a predetermined factor.

9. A method for scaling video pixel data as claimed in claim 7 wherein horizontally scaling said video pixel data further comprises:

multiplying a predetermined number of said video pixel data by a same number of predetermined coefficients;

summing the products of said predetermined coefficients and said video pixel data;

dividing said summation by the sum of said predetermined coefficients to produce horizontally-smoothed pixel data; and reducing the number of horizontally-smoothed pixel data by a predetermined factor to produce horizontally-scaled pixel data.

* * * * *